(12) United States Patent
Toqan et al.

(10) Patent No.: US 8,904,799 B2
(45) Date of Patent: Dec. 9, 2014

(54) TANGENTIAL COMBUSTOR WITH VANELESS TURBINE FOR USE ON GAS TURBINE ENGINES

(76) Inventors: Majed Toqan, Abu Dhabi (AE); Brent Allan Gregory, Scottsdale, AZ (US); Ryan Sadao Yamane, Gilbert, AZ (US); Jonathan David Regele, Fountain Hills, AZ (US)

(*) Notice: Subject to any disclaimer, the term of this patent is extended or adjusted under 35 U.S.C. 154(b) by 972 days.

(21) Appl. No.: 12/786,882

(22) Filed: May 25, 2010

(65) Prior Publication Data
US 2011/0209482 A1 Sep. 1, 2011

Related U.S. Application Data

(60) Provisional application No. 61/180,909, filed on May 25, 2009.

(51) Int. Cl.
*F23R 3/52* (2006.01)
*F01D 9/02* (2006.01)

(52) U.S. Cl.
CPC .............. *F01D 9/023* (2013.01); *Y02T 50/67* (2013.01); *F23R 3/52* (2013.01); *Y02T 50/675* (2013.01)
USPC ................................. 60/752; 60/755; 60/756

(58) Field of Classification Search
CPC ........... F23R 3/52; F01D 9/023; Y02T 50/67; Y02T 50/675
USPC ............ 60/752–760, 733, 746, 747, 761, 766
See application file for complete search history.

(56) References Cited

U.S. PATENT DOCUMENTS

| | | | | | |
|---|---|---|---|---|---|
| 2,625,792 | A | * | 1/1953 | McCarthy et al. | 60/757 |
| 2,704,440 | A | * | 3/1955 | Nicholson | 60/737 |
| 2,883,828 | A | * | 4/1959 | Howell | 60/246 |
| 2,913,873 | A | * | 11/1959 | Murray | 60/756 |
| 3,100,627 | A | * | 8/1963 | Wilde | 366/262 |
| 3,811,277 | A | * | 5/1974 | Markowski | 60/733 |
| 3,880,575 | A | * | 4/1975 | Cross et al. | 431/353 |
| 3,934,408 | A | | 1/1976 | Irwin | |
| 4,050,241 | A | * | 9/1977 | DuBell | 60/757 |
| 4,098,075 | A | * | 7/1978 | Greenberg et al. | 60/804 |
| 4,652,476 | A | * | 3/1987 | Kromrey | 428/34.1 |
| 4,928,481 | A | * | 5/1990 | Joshi et al. | 60/737 |
| 4,938,020 | A | * | 7/1990 | Shekleton et al. | 60/39.26 |
| 4,949,545 | A | * | 8/1990 | Shekleton | 60/756 |
| 5,259,182 | A | * | 11/1993 | Iwai et al. | 60/777 |
| 5,261,224 | A | * | 11/1993 | Shekleton et al. | 60/804 |

(Continued)

*Primary Examiner* — William H Rodriguez
*Assistant Examiner* — Carlos A Rivera
(74) *Attorney, Agent, or Firm* — Michael W. Goltry; Robert A. Parsons; Parsons & Goltry (57) ABSTRACT

A combustion device used in gas turbine engines includes an annular combustor that contains the combustion process of air and fuel and then guides the hot gas products to a first stage turbine subsection of a gas turbine engine. The annular combustor has an inner/outer shell having corrugated surfaces that extend radially outward and inward across an entire hot gas stream inside the annular combustor. The corrugations twist about the engine centerline in a longitudinal direction of travel of the engine. The resulting flow path accelerates and turns the hot gas stream to conditions suitable for introduction into the first stage turbine blades, which eliminate the need for first stage turbine vanes. The annular combustor is configured with a system of fuel and air inlet passages and nozzles that results in a staged combustion of premixed fuel and air.

6 Claims, 7 Drawing Sheets

(56) References Cited

U.S. PATENT DOCUMENTS

| | | | | |
|---|---|---|---|---|
| 5,279,127 | A | * | 1/1994 | Napoli ............................ 60/754 |
| 6,655,147 | B2 | * | 12/2003 | Farmer et al. ................... 60/752 |
| 7,716,931 | B2 | * | 5/2010 | Mancini et al. ................. 60/748 |
| 2004/0216463 | A1 | | 11/2004 | Harris |
| 2005/0241319 | A1 | | 11/2005 | Graves et al. |
| 2007/0125093 | A1 | | 6/2007 | Burd et al. |
| 2008/0041059 | A1 | | 2/2008 | Teets |

* cited by examiner

TANGENTIAL COMBUSTOR WITH VANELESS TURBINE FOR USE ON GAS TURBINE ENGINES

CROSS-REFERENCE TO RELATED APPLICATION

This application claims the benefit of U.S. Provisional Patent Application Ser. No. 61/180,909, filed May 25, 2009.

FIELD OF THE INVENTION

This invention relates to devices in gas turbine engines that contain the combustion of a fuel and air flow as well as devices that manipulate the hot gases' trajectory in such a way to take an ideal path entering the turbine stage. Such devices include but are not limited to fuel-air nozzles, combustor liners and casings, flow transition pieces, and guide vanes that are used in military and commercial aircraft, power generation, and other gas turbine related applications.

BACKGROUND OF THE INVENTION

Gas turbine engines include machinery that extracts work from combustion gases flowing at high temperatures, pressures and velocity. The extracted work can be used to drive a generator for power generation or for providing the required thrust for an aircraft. A typical gas turbine engine consists of a multistage compressor where the atmospheric air is compressed to high pressures. The compressed air is then mixed at a specified fuel-air ratio in a combustor wherein its temperature is increased. The high temperature and pressure combustion gases are then expanded through a turbine to extract work so as to provide the required thrust or drive a generator or a compression device depending on the application. The turbine includes at least a single stage with each stage consisting of a row of blades and a row of vanes. The blades are circumferentially distributed on a rotating hub with the height of each blade covering the hot gas flow path. Each stage of non-rotating vanes is placed circumferentially, which also extends across the hot gas flow path. The included invention involves the combustor and turbine sections of gas turbine engines, each of which will be further discussed.

The combustor portion of a gas turbine engine can be of several different types: silo, can/tubular, annular, and a combination of the last two forming a can-annular combustor. It is in this component that the compressed fuel-air mixture passes through fuel-air nozzles and a combustion reaction of the mixture takes place, creating a hot gas flow causing it to drop in density and accelerate downstream. The can combustor typically comprises of individual, circumferentially spaced cans that contain the flame of each nozzle separately. Flow from each can is then directed through a duct and combined in an annular transition piece before it enters the first stage vane. In the annular combustor type, fuel-air nozzles are typically distributed circumferentially and introduce the mixture into a single annular chamber where combustion takes place. Flow simply exits the downstream end of the annulus into the first stage turbine, without the need for a transition piece. The key difference of the last type, a can-annular combustor, is that it has individual cans encompassed by an annular casing that contains the air being fed into each can. Each variation has its benefits and disadvantages, depending on the application.

In combustors for gas turbines, it is typical to premix the fuel and the air before it enters the combustion chamber through a set of fuel-air nozzles. These nozzles introduce a swirl to the mixture for several reasons. One is to enhance mixing and thus combustion, another reason is that adding swirl stabilizes the flame to prevent flame blow out and it allows for leaner fuel-air mixtures for reduced emissions. A fuel air nozzle can take on different configurations such as single to multiple annular inlets with swirling vanes on each one.

As with other gas turbine components, implementation of cooling methods to prevent melting of the combustor material is needed. A typical method for cooling the combustor is effusion cooling, implemented by surrounding the combustion liner with an additional, offset liner, which between the two, compressor discharge air passes through and enters the hot gas flow path through dilution holes and cooling passages. This technique removes heat from the component as well as forms a thin boundary layer film of cool air between the liner and the combusting gases, preventing heat transfer to the liner. The dilution holes serve two purposes depending on its axial position on the liner: a dilution hole closer to the fuel-air nozzles will cool the liner and aid in the mixing of the gases to enhance combustion as well as provide unburned air for combustion, second, a hole that is placed closer to the turbine will cool the hot gas flow and can be designed to manipulate the combustor outlet temperature profile.

The next portion of a gas turbine engine that the flow travels through is the first stage vane and turbine. At this point in a gas turbine engine, the hot gases are further accelerated as well as turned to a velocity that allows it to strike a row of turbine blades that extract work from the hot gases by producing lift on the turbine blades which results in the rotation of a drive shaft. In such an application, the turbine blades and vanes in the hot gas path operate under conditions of high temperature, pressure, and velocity. These hostile conditions cause thermal oxidation and surface deterioration leading to reduced component life. Inlet turbine gas temperatures typically reach about 200-300° C. above the melting point of turbine components. These high temperatures significantly deteriorate the surface conditions and increase the surface roughness; therefore, it is important that these surfaces be cooled. A variety of designs, materials and configurations are used in gas turbine engines that provide structural robustness as well as effectively cool the turbine vanes and blades in order to enhance its durability against hot combustion gases; however, there has been no attempt at modifying the combustor and turbine in such a way as to eliminate the need for the first row vanes entirely. Currently, this first row of turbine vanes require the development of various technologies in order to cope with the extreme operating environment that include but are not limited to: expensive nickel-alloys, thermal barrier coating, complex casting methods to incorporate internal cooling passages, and filming cooling techniques. In some cases the first row vanes can represent approximately 5% of the complete gas turbine engine cost. In addition, approximately 2% of the total flow losses through a gas turbine can be attributed to pumping cooling air through this single component. This invention will function in a manner consistent with today's gas turbines; however, it will do so without the first stage vane nozzle thus eliminating the associated issues of cost and performance losses.

SUMMARY OF THE INVENTION

With regard to the present invention, there is provided a novel and improved combustor design that is capable of operating in a typical fashion, but displaces the need for a vane nozzle by the combination of having the flue gas exit the combustor with a tangential angle and using the proposed corrugated combustor geometry. The invention consists of a modified combustor liner with corrugations that protrude into and across the entire hot gas stream and also twist about and along the engine centerline. The corrugations turn and accelerate the hot gases to the ideal velocity for the turbine inlet as a typical gas turbine vane nozzle would. To decrease the length of the corrugation section, the fuel/air nozzles are setup in a circumferential mode around the combustor liners in order to establish the tangential angle at the combustor exit. As with other engine components, the corrugations cannot escape the volatile environment in the hot gas path; therefore, impingement, effusion or any other cooling method can be utilized. Cooling air is supplied via the compressor discharge air, which flows between the main combustor liner and another encompassing it and travels through the inside of the corrugations (outside the liner containing the combustion), where it cools the combustor material, and then mixes with the hot gases just upstream from the turbine or the heated air is directed to enter the combustion chamber through the fuel/air nozzles. This invention will result in the removal of the nozzle guide vane (NGV) from the $1^{st}$ stage turbine, or at the very least, decrease its required size, which will reduce the cost to manufacture and also minimize inefficiencies that arise from pumping large amounts of cooling air through the components' internal passages to keep the component materials within their operational limits.

The invention also consists of premixed fuel-air nozzles and/or dilution holes that introduce the compressor discharge air and pressurized fuel into the combustor at various locations in the longitudinal and circumferential directions. The fuel and air inlets are placed in such a way as to create an environment with enhanced mixing of combustion reactants and products. Staging the premixed fuel and air nozzles to have more fuel upstream from another set of downstream nozzles enhances the mixing of the combustion reactants and creates a specific oxygen concentration in the combustion region that greatly reduces the production of NOx. In addition, the introduction of compressor discharge air downstream of the combustion region allows for any CO produced during combustion to be burned/consumed before entering the first stage turbine. In effect, the combustor will improve gas turbine emission levels, thus reducing the need for emission control devices as well as minimize the environmental impact of such devices. In addition to this improvement, the tangentially firing fuel and fuel-air nozzles directs its flames to the adjacent burner, greatly enhancing the ignition process of the combustor.

BRIEF DESCRIPTION OF THE DRAWINGS

Referring to the drawings.

DETAILED DESCRIPTION

Figure 1:
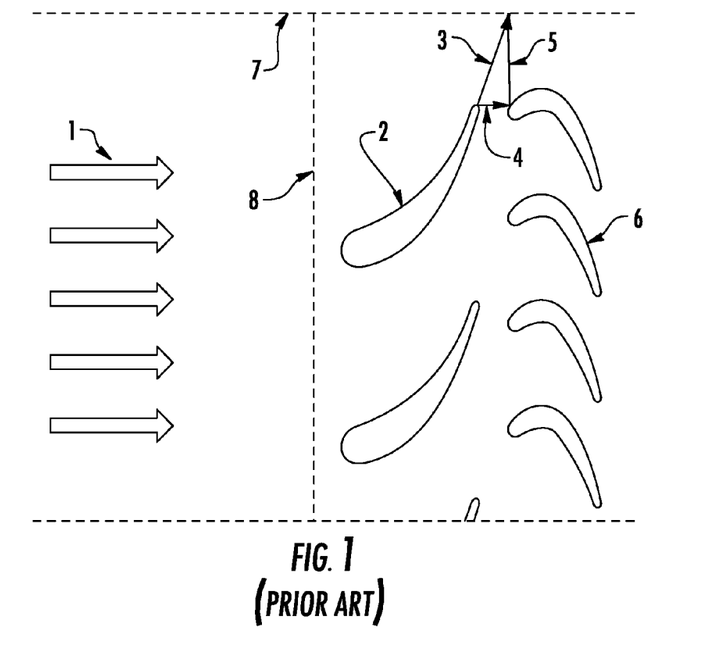
FIG. 1 is a two-dimensional diagram, depicting a generic configuration of a standard combustor, first stage vanes and turbine blades for a gas turbine engine and the flow through same, as seen through a surface of constant radius that intersects with the geometry.

FIG. 1 shows the general premise of the combustor and first stage turbine of a gas turbine engine. Hot, combusted gases 1 flow in the longitudinal direction through combustor 7 where they exit the combustor threshold 8. From there, the gases are accelerated and guided by the first stage vane 2 from which the gases now have a resultant velocity 3 with a longitudinal component 4 and a circumferential component 5 and minimal radial component. This accelerated and turned gas flow then flows around the first stage turbine blades 6, where work is extracted and transferred to the turbine blades and the rotor connected thereto.

Figure 2:
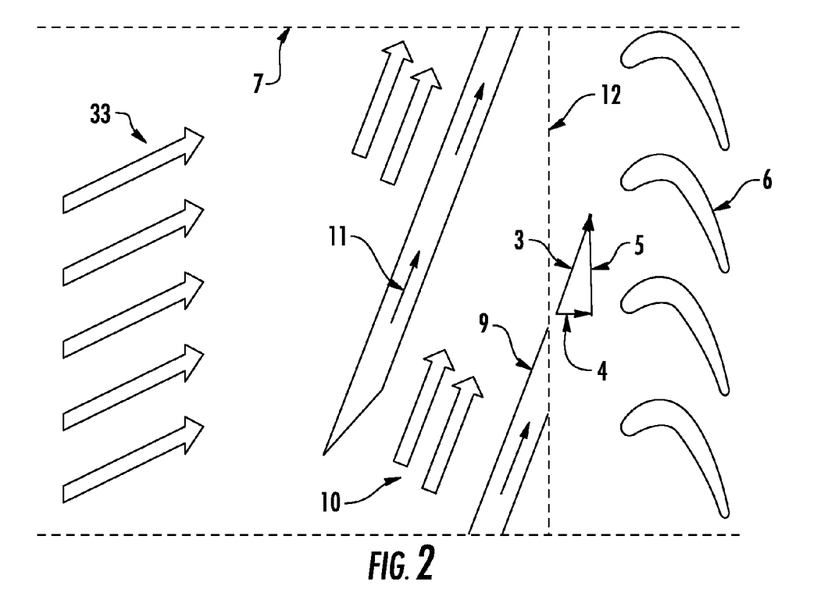
FIG. 2 is a two-dimensional diagram depicting a generic configuration of the invention and first stage turbine blade sections and the flow through same, as seen through a surface of constant radius that intersects with the geometry.

FIG. 2 shows the general premise of the invention and consists of the modified combustor 7 and first stage turbine blades, which are to work on a gas turbine engine. Here, hot combusted gases that have a substantial circumferential component of velocity 33 from the tangentially aimed fuel air nozzles, flow through the combustor 7 where it is further turned and accelerated through the corrugations. in circumferential direction 11 These turned hot gases 10, achieve this condition by first the circumferential arrangement of the fuel/air nozzles and the guidance of the corrugated surfaces 9 that extend through the combustor. The hot gases 10 leave the longitudinal threshold of the combustor 12 with a resultant velocity 3, which has a longitudinal component 4 and a circumferential component 5 and minimal radial velocity. The flow then passes the $1^{st}$ stage turbine blades 6, where work is then extracted.

Figure 3:
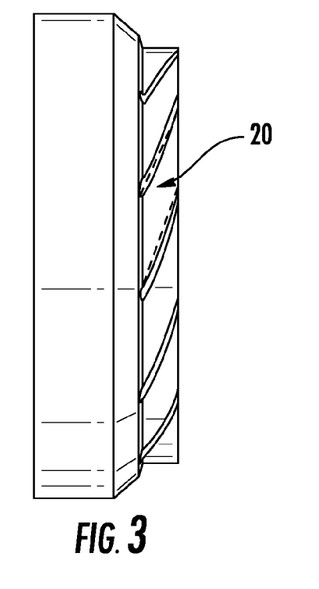
FIG. 3 is a side view of an annular combustor, with said corrugations, oriented such that the direction of flow is from left to right.
Figure 4:
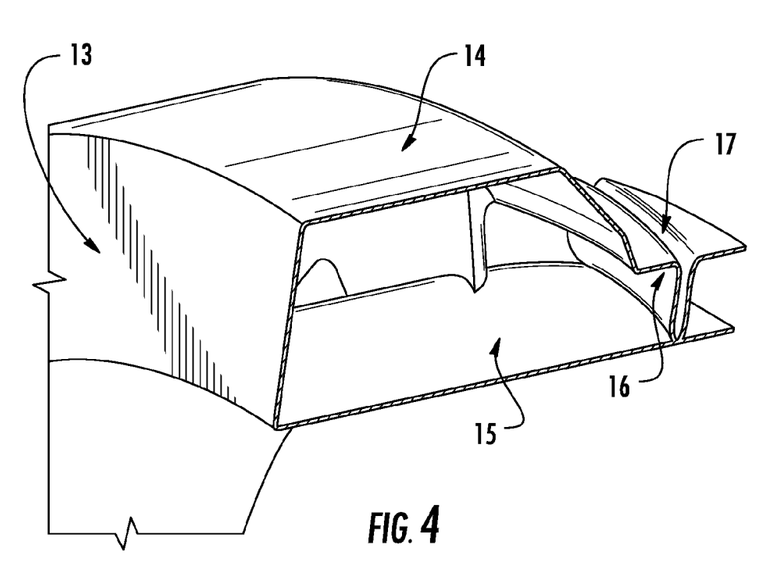
FIG. 4 is an isometric, cutaway view of an example invention with the cutaway exposing the profile of the corrugation and giving insight into how the corrugation appears from the inside.
Figure 13:
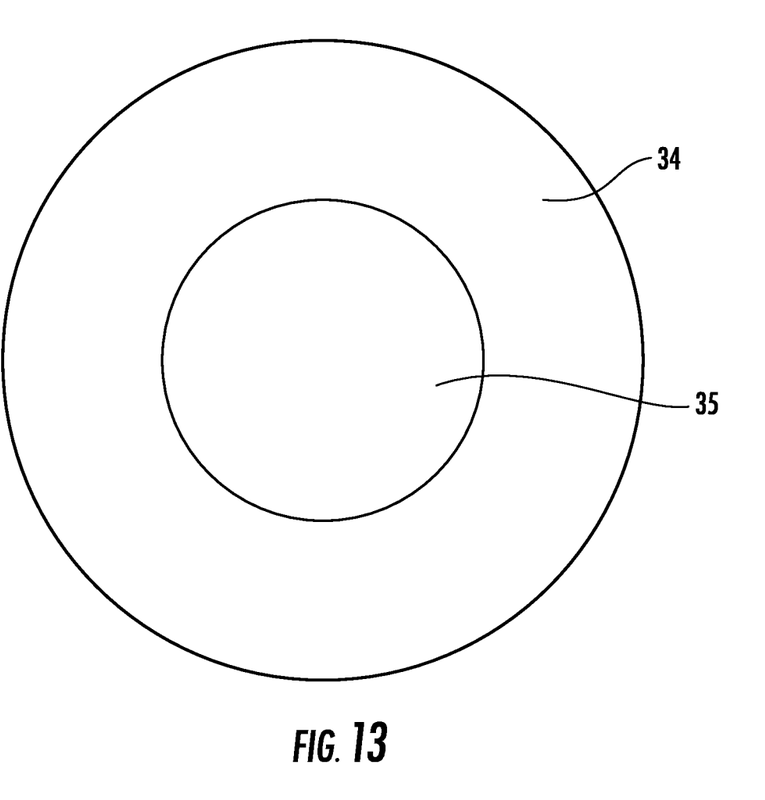
FIG. 13 is a two dimensional diagram showing a generic nozzle cross section layout of the fuel-air nozzles.

FIGS. 3 and 4 show the general design concept of the invention. The annular combustor is made up of essentially two concentric cylinders 14 & 15 forming an annular volume with the upstream end/opening of the two connected/enclosed with an annular face 13 called the front wall. These two cylinders may be of constant radius or have a variable radius that changes in the longitudinal and/or circumferential direction. Fuel-air nozzles are placed in a circumferential arrangement surrounding the outer liner where the flow generated has a strong tangential component in the said invention. For example, they can be arranged in a single row or multiple ones aligned circumferentially on the perimeter of the inner and/or outer liners 14 & 15 where they will inject fuel and air mainly with a tangential component (the injected mixture can exhibit longitudinal and radial components as well). Another placement of the fuel-air nozzles can again be evenly and circumferentially placed, but on the outer shell 14 where the nozzles direct the flow into the combustor volume with mainly a circumferential component of velocity (the injected mixture can also exhibit a longitudinal and/or radial component). The fuel-air nozzles may take on the generic layout as seen in the schematic of FIG. 13. The FIG. shows a possible embodiment where a circular region 35 in the center of the nozzle may contain an axial swirler where a rich fuel-air mixture passes through and/or a concentric pilot fuel-air nozzle. The key to the tangential fuel-air nozzles is the annular region 34 of the nozzle where air or lean premixed fuel-air mixture may enter with little to no swirl. The purpose of the annular inlet with low swirl is to ensure a substantial tangential inlet velocity into the combustor. This will increase the circumferential velocity component of the flow as it leaves the combustor into the turbine, allowing for a shorter $1^{st}$ stage turbine vane or corrugations.

Downstream of the fuel-air nozzles is where the corrugations are located. The corrugations are formed by one or both of the inner 15 and/or outer 14 shell(s) protruding into and across the combustor volume where the shells can either meet or maintain a small gap. If the two shells 14 & 15 were to meet, it would form a line or thin surface contact. This theoretical line represents the path the surfaces take inside the combustor. This path moves longitudinally while rotating about the engine centerline. The amount of rotation depends on the length of the corrugated portion of the combustor, the number of corrugations and the angles of the start and end of the aforementioned line. Two angles are important in the invention, the first is the angle formed between a line tangent to the start of the pathline and the engine centerline that is in a plane which is normal to the radius between the endpoint and engine centerline. The second angle that is important is between a line tangent to the end (downstream point) of the pathline and the engine centerline that is in a plane which is normal to the radius between the endpoint and engine centerline. The second angle must be between 60 and 80 degrees in order for the hot gas flow exiting the combustor to achieve flow conditions suitable for direct introduction to the first stage turbine blades 6. Each corrugation length must be such that there is a long enough path 20 for which the hot gases can develop and exit the combustor at an angle near the geometry exit angle. The operation of the invention is possible because the surfaces protruding into the combustor 16 & 17 volume create an obstruction in the hot gas flow that the combustor shell contains. The hot gas is therefore forced to follow the path of the corrugations as it would a row of stationary vanes.

Figures 5, 6A, 6B:
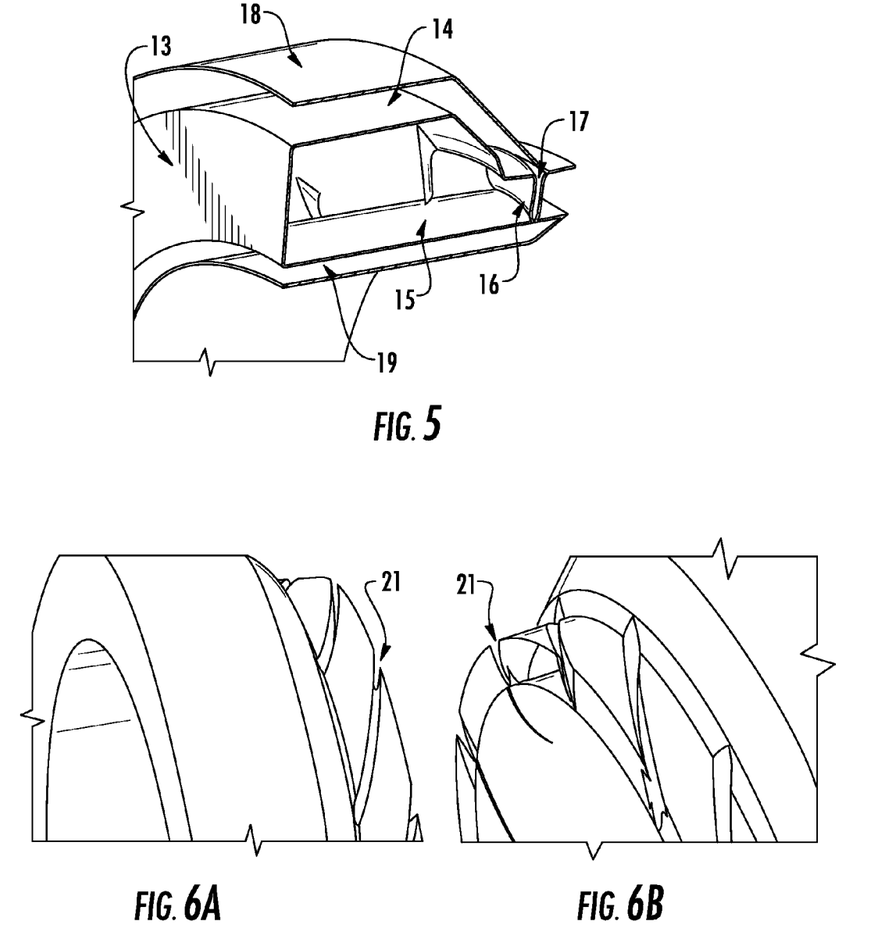
FIG. 5 is an isometric, cutaway view of an example invention that includes the second liner that encompasses the main combustor liner, where the cutaway exposes the generic profile.
FIG. 6A shows a close-up isometric view with the view direction looking slightly downstream of the example invention, which shows outside surfaces of the corrugation.
FIG. 6B shows a close-up isometric view with the view direction looking slightly upstream of the example invention, which shows the start and end of the corrugations.
Figure 7:
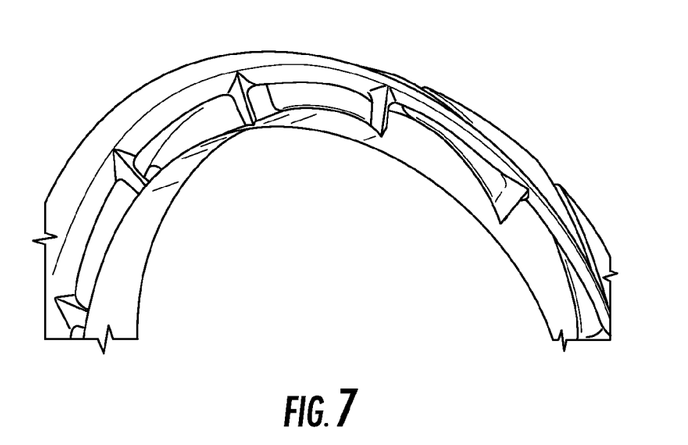
FIG. 7 is an isometric cutaway view looking in the downstream direction inside the corrugated section of the combustor.

As is common with other annular combustors, a second shell/liner 18 & 19 encompasses the main combustor shell that envelops the combustion process. This liner may have constant radii or variable radii in the longitudinal and/or circumferential directions. This liner creates an annular volume inside and outside the annular combustion region. Compressor discharge air is passed through these regions with the intent of removing heat from the combustor shell 14 & 15. Additionally, the outer cooling region is open to the 1st stage turbine at the downstream end; therefore the flow is pressure driven and exits at this end of the combustor. In this outer, annulus region, the discharge air travels downstream and through the outside of the corrugations 21, removing heat from that material as well before entering the first stage turbine. This outer liner 18 must attach to the outer combustor shell 14 by establishing a surface contact between 14 and 18 at the end of the combustor. The surface contact will begin at the combustor exit, and end slightly upstream. Establishing this type of mounting/joining of the two liners 14 & 18 creates an enclosed corrugation channel 21 on the cooling flow side. This allows for the cooling flow to become more developed before entering the turbine inlet. In this example, the inner cooling region does not enter the 1st stage turbine. Instead, dilution holes placed in the regions at and around the corrugations allow for the compressor discharge air traveling through this region to transfer to the outer cooling region. Flow through these dilution holes will enhance heat transfer from the combustor shell material, thus aiding in cooling.

Figure 8A:
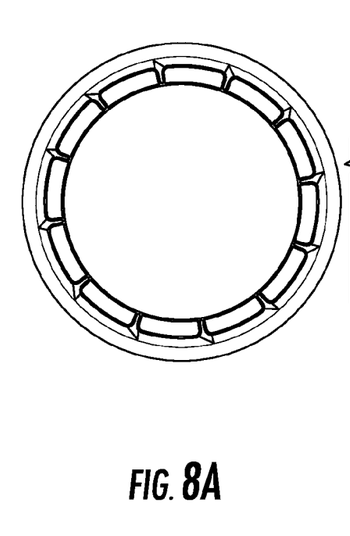
FIG. 8A is a back view of the full combustor with the discharge openings for the hot combustion gases highlighted.
Figure 8B:
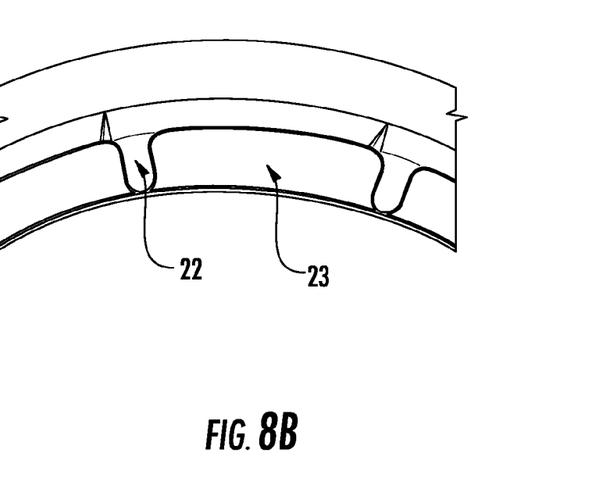
FIG. 8B is a zoomed back view of the combustor highlighting the discharge openings for the hot combustion gases.

Looking at the outlet face for the combustor system, which is normal to the longitudinal direction, there are periodic regions: a large region for the hot gas flow 23 and a region with a smaller circumferential width 22 where the cooling flow exits the combustor and is introduced into the hot gas stream just upstream of the turbine blades.

In another embodiment, the air that cools the corrugation section is directed towards the fuel/air nozzles where this air enters the combustion chamber and help to improve the flame stability.

Figure 9:
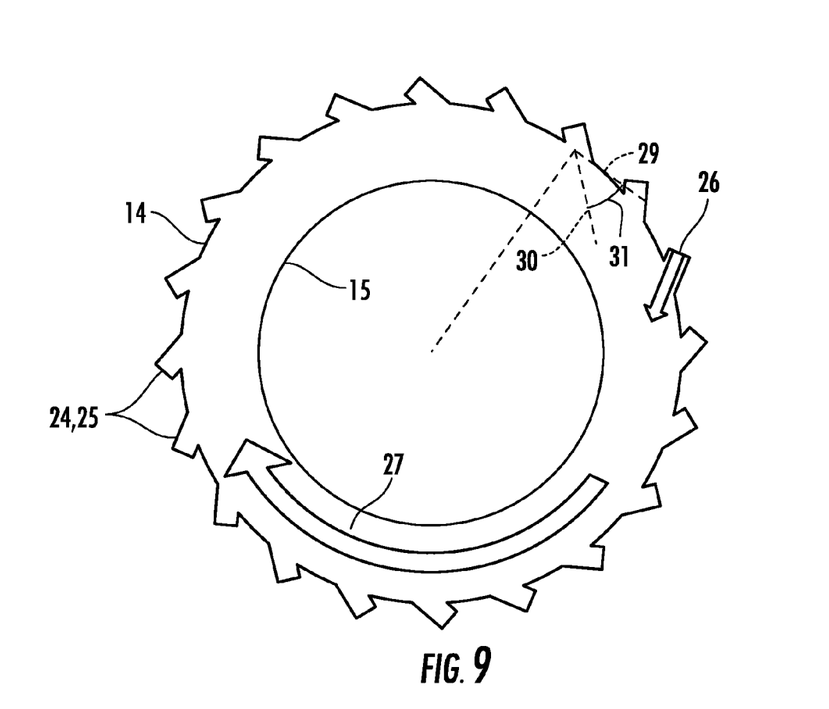
FIG. 9 is a two-dimensional sketch showing the nozzles that attach to the outer combustor liner and have a circumferential and radial direction into the combustor (possible longitudinal direction of the nozzle not shown)

The corrugations mentioned above to be implemented in an annular combustor with the following features. FIG. 9 shows the general premise of an annular combustor with tangentially directed fuel-air nozzles. The combustor is composed of an outer shell (or liner) 14, an inner shell (or liner) 15, both of which can have a constant or varying radius in the longitudinal direction, and a front wall 32 that connects the inner and outer liners 14, 15. As seen in the FIG., an example configuration of the invention shows premixed fuel-air nozzles 24, 25 pointing mainly in a circumferential direction, where the angle 31 is formed between a line 29 tangent to the outer liner and the nozzle 24, 25 centerlines 30, but may have a radial or longitudinal component to its direction. These various nozzles 24, 25 may share a common plane defined by the longitudinal direction and a point along the engine centerline and may be equally spaced circumferentially or have pattern to the spacing in this direction. The nozzles introduce a premixed fuel-air mixture 26 into the combustor volume created by the inner and outer shell 14, 15 and the front wall 32. The reactants that are injected by the fuel and air nozzles 24, 25 combust within this region and create a flow field 27 through the combustor that rotates about the engine centerline.

Figure 10:
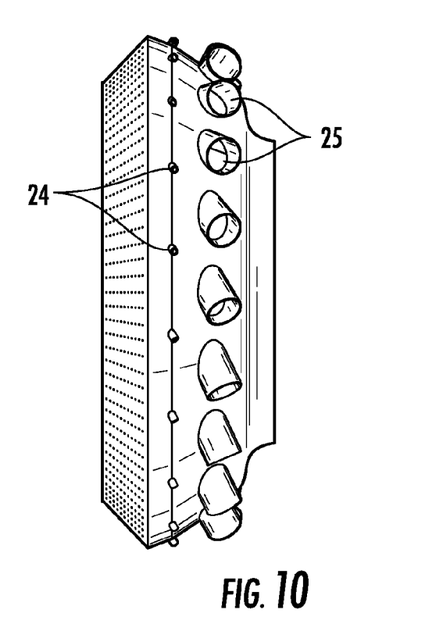
FIG. 10 is an isometric side view of an example annular combustor without corrugations with the proposed staged fuel and air injection.
Figure 11:
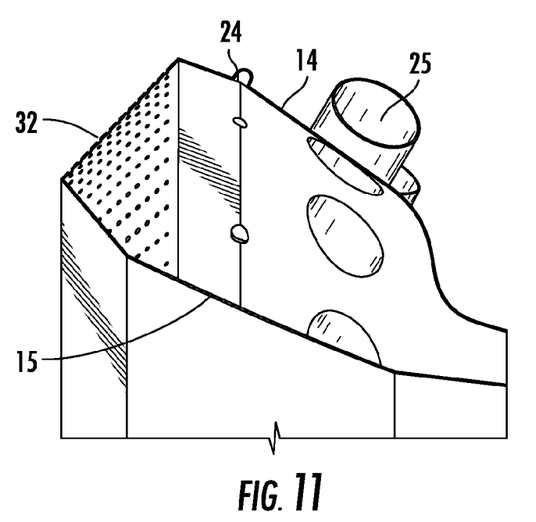
FIG. 11 is an isometric section view with the cutting plane defined by the engine centerline and a radius.
Figure 12A:
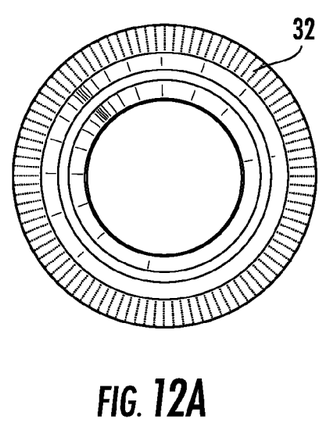
FIG. 12A is an isometric front view of the example combustor without corrugations from a front to aft perspective that shows perforated front wall.
Figure 12B:
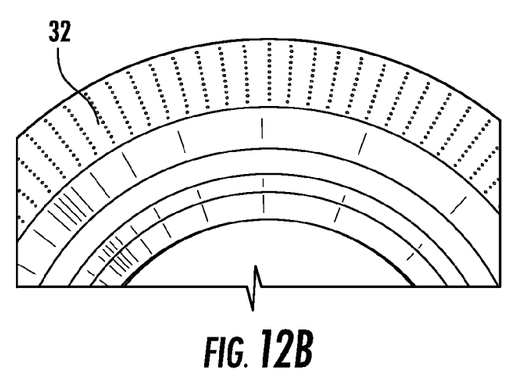
FIG. 12B is a close up view of the image from FIG. 12A.

FIG. 10 shows an example configuration for the invention where fuel/air nozzles 24, 25 are placed upstream (to the left) of a second set of fuel-air nozzles that share a common plane and are circumferentially spaced. The number of fuel nozzles 24, 25 may be at least one, and up to an unlimited amount. Compressor discharge air may also be introduced to the combustor volume through a perforated front wall 32 as seen in FIGS. 11, 12A and 12B. The injection of the mixture near the front wall, which may have a higher fuel/air ratio than the second set of nozzles in conjunction with the mixture that is injected downstream of the fuel nozzles 24, 25, creates the desired mixing and fuel-air staging effect that will create an optimal combustion environment that reduces NOx and CO emissions from the combustor. The hot combustion products then exit the combustor through an annular opening 23 as seen in FIGS. 8A and 8B where it enters the first stage turbine of the gas turbine.

The present invention is described above with reference to a preferred embodiment. However, those skilled in the art will recognize that changes and modifications may be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

The invention claimed is:

1. An annular combustor for a gas turbine engine for use in ground-based power generation, land or sea based vehicles or aircraft engines, the annular combustor comprises:
    a combustor, the combustor includes an outer shell, an inner shell, a front wall, and corrugations, the front wall connects the outer shell to the inner shell so as to form an annular volume arranged about a centerline of the combustor, the outer shell and the inner shell extend from the front wall to the corrugations and an annular discharge opening, the corrugations and the annular discharge opening are opposite to the front wall, the corrugations are spaced apart and circumferentially arranged about the centerline of the combustor and lead to the annular discharge opening, and the annular discharge opening is arranged about the centerline of the combustor;
    tangentially pointing and circumferentially spaced nozzles in the outer shell between the front wall and the corrugations and the annular discharge opening, the tangentially pointing and circumferentially spaced nozzles are for injecting combustion gas into the annular volume in tangentially circumferential directions for producing a flow of the combustion gas flowing through the annular volume from the front wall to the annular discharge opening in a first circumferential direction at a circumferential velocity; and
    the corrugations are circumferentially spaced and each of said corrugations extends along a path to the annular discharge opening that twists about the centerline of the combustor for interacting with the flow of the combustion gas flowing through the annular volume for turning the flow of the combustion gas flowing through the annular volume from the first circumferential direction to a second circumferential direction that is different from the first circumferential direction for accelerating the circumferential velocity of the flow of the combustion gas to the annular discharge opening.

2. The annular combustor according to claim 1, wherein the corrugations extend into the annular volume.

3. The annular combustor according to claim 2, wherein the corrugations are downstream from the nozzles near the annular discharge opening.

4. An annular combustor for a gas turbine engine for use in ground-based power generation, land or sea based vehicles or aircraft engines, the annular combustor comprises:
    a main combustor shell includes a front wall and corrugations, the main combustor shell defines an annular volume that is arranged about a centerline of the main combustor shell and extends from the front wall to the corrugations and an annular discharge opening, the corrugations and the annular discharge opening are opposite to the front wall, and the corrugations are spaced apart and circumferentially arranged about the centerline and lead to the annular discharge opening;
    tangentially pointing and circumferentially spaced nozzles in the main combustor shell between the front wall and the corrugations and the annular discharge opening, the tangentially pointing and circumferentially spaced nozzles are for injecting combustion gas into the annular volume in tangentially circumferential directions for producing a flow of the combustion gas flowing through the annular volume to the annular discharge opening in a first circumferential direction at a circumferential velocity; and
    the corrugations are circumferentially spaced and each of said corrugations extends along a path to the annular discharge opening that twists about the centerline of the combustor for interacting with the flow of the combustion gas flowing through the annular volume for turning the flow of the combustion gas flowing through the annular volume from the first circumferential direction to a second circumferential direction that is different from the first circumferential direction for accelerating the circumferential velocity of the flow of the combustion gas to the annular discharge opening.

5. The annular combustor according to claim 4, wherein the corrugations extend into the annular volume.

6. The annular combustor according to claim 5, wherein the corrugations are downstream from the nozzles near the annular discharge opening.

* * * * *